(12) United States Patent
Wengerter et al.

(10) Patent No.: US 7,924,804 B2
(45) Date of Patent: Apr. 12, 2011

(54) SCHEDULING DEPENDING ON QUALITY OF SERVICE AND CHANNEL PROPERTIES

(75) Inventors: Christian Wengerter, Langen (DE); Jan Ohlhorst, Langen (DE)

(73) Assignee: Panasonic Corporation, Osaka (JP)

( * ) Notice: Subject to any disclaimer, the term of this patent is extended or adjusted under 35 U.S.C. 154(b) by 543 days.

(21) Appl. No.: 12/064,695

(22) PCT Filed: Jun. 20, 2006

(86) PCT No.: PCT/EP2006/005917
§ 371 (c)(1),
(2), (4) Date: Jun. 26, 2008

(87) PCT Pub. No.: WO2007/022817
PCT Pub. Date: Mar. 1, 2007

(65) Prior Publication Data
US 2009/0219912 A1 Sep. 3, 2009

(30) Foreign Application Priority Data

Aug. 26, 2005 (EP) .................................... 05018625

(51) Int. Cl.
*H04J 3/00* (2006.01)
(52) U.S. Cl. ........ 370/345; 370/322; 370/326; 370/442; 370/348; 455/450; 455/464; 455/511; 455/515
(58) Field of Classification Search .................. 370/322, 370/326, 329, 442, 345, 348; 455/450, 464, 455/511, 515
See application file for complete search history.

(56) References Cited

U.S. PATENT DOCUMENTS

| | | | | |
|---|---|---|---|---|
| 5,629,928 A | * | 5/1997 | Calvignac et al. | 370/237 |
| 6,009,097 A | * | 12/1999 | Han | 370/395.52 |
| 7,075,911 B2 | * | 7/2006 | Bernhard et al. | 370/331 |
| 7,145,895 B2 | * | 12/2006 | Mueckenheim et al. | 370/348 |
| 7,239,641 B1 | * | 7/2007 | Banks et al. | 370/397 |
| 2003/0026267 A1 | * | 2/2003 | Oberman et al. | 370/397 |
| 2003/0223361 A1 | * | 12/2003 | Hussain et al. | 370/230 |
| 2005/0111361 A1 | | 5/2005 | Hosein | |

FOREIGN PATENT DOCUMENTS

| | | |
|---|---|---|
| EP | 1 130 872 | 9/2001 |
| EP | 1 209 936 | 5/2002 |
| EP | 1 257 096 | 11/2002 |

OTHER PUBLICATIONS

International Search Report dated Jul. 25, 2006.

\* cited by examiner

*Primary Examiner* — Jeffrey Pwu
*Assistant Examiner* — Abdelnabi O Musa
(74) *Attorney, Agent, or Firm* — Dickinson Wright PLLC

(57) ABSTRACT

A method is described for scheduling a plurality of data flows to a plurality of shared channels in a wireless communication system transmitting data packets in time intervals of frames and applying adaptive modulation and coding. The method comprises the steps of determining virtual link adaptation parameters for at least a part of all combinations of data flow and shared channel, based on state information from the respective shared channel, and based on Quality of Service requirements for the respective data flow; calculating potential data rates for said combinations of data flow and shared channel, based on said virtual link adaptation parameters; calculating priority values for said combinations of data flow and shared channel, based on said potential data rates; and selecting, based on the calculated priority values, for at least a part of the shared channels, a data flow for which data is to be transmitted on each of these shared channel during the time interval of one frame.

18 Claims, 5 Drawing Sheets

SCHEDULING DEPENDING ON QUALITY OF SERVICE AND CHANNEL PROPERTIES

BACKGROUND OF THE INVENTION

1. Field of the Invention

The invention relates to communication of data between at least one transmitter and at least one receiver. It is particularly applicable to communication systems where the data is transmitted over a time-variant and/or frequency-variant channel, such as in mobile communication systems or satellite communication.

2. Description of the Related Art

The following sections will concentrate on the downlink transmission, however without loss of generality the same is valid for uplink transmission.

Dynamic Channel Allocation (DCA)

In wireless communication systems employing Dynamic Channel Allocation (DCA) schemes, at least part of the air interface resources are assigned dynamically to different users (mobile stations, MS). See R, van Nee, R. Prasad, "OFDM for Wireless Multimedia Communications", Artech House, ISBN 0 89006 530 6, 2000, pp. 213-228 and H. Rohling and R. Grunheid, "Performance of an OFDM-TDMA mobile communication system," in Proc. IEEE Vehicular Technology Conf. (VTC'96), Atlanta, Ga., pp. 1589-1593, 1996. Those dynamically allocated resources are usually defined by Shared Physical Channels, where a Shared Physical Channel corresponds to e.g. one or multiple bundled codes in a Code Division Multiple Access (CDMA) system, one or multiple bundled subcarriers (subchannels) in an Orthogonal Frequency Division Multiplex Access (OFDMA) system or to combinations of those in an Orthogonal Frequency Code Division Multiplex Access (OFCDMA) or an Multi Carrier Code Division Multiple Access (MC CDMA) system.

For the context of this description, a subchannel shall be regarded as comprising at least one subcarrier, wherein the subcarriers belonging to a subchannel may be selected adjacent to each other or distributed over the transmission bandwidth. The number of subcarriers per subchannel may vary between subchannels and/or be configured dynamically.

FIG. 1 and FIG. 2 show DCA schemes for systems with a single and multiple Shared Physical Channels respectively, where a PHY Frame reflects the unit for which a so called scheduler (PHY/MAC Scheduler) performs the DCA.

It should be noted, that a Multiple Shared Channel system may also be viewed as a Single Shared Channel System, where the Single Shared Channel consists out of multiple subchannels (resources). In this case multiple users (mobile stations) may be allocated on the same Shared Channel at a time, but on different subchannels.

FIG. 1 illustrates a structure where data for four mobile stations $U_1 \ldots U_4$ is transmitted over one shared physical channel 102. The time axis is represented by arrow 101. Boxes 103 to 108 represent PHY frames, wherein, as an illustrative example, frame 106 carries data for a first mobile station, frame 103 carries data for a second mobile station, frames 104 and 108 carry data for a third mobile station and frames 105 and 107 carry data for a fourth mobile station. In this example, a frequency or code division duplex system is shown, where one resource/subchannel (i.e. frequency band or code) is continuously available for the depicted shared physical channel. In case of TDD, where an uplink PHY channel and a downlink PHY channel share one frequency or code, there would be gaps between the frames or within the frames of one channel corresponding to the duration of the transmission of a channel in the opposite direction. For this case, all description below would likewise be applicable as well.

FIG. 2 illustrates the case where N shared physical channels 202 to 205 transmit data designated to four mobile stations. Arrow 201 represents the time axis. Columns 230 to 235 represent the time units of PHY frames for all channels. Boxes 206 to 229 represent data units defined by PHY channels and PHY frames. For example, data in boxes 206 to 211 is transmitted over PHY channel 1 and data in boxes 206, 212, 218 and 224 is transmitted during frame 230. In the given example, the data units 208, 212, 220, 221, 223, 225 and 227 carry data for a first mobile station $U_1$, 206, 207, 215, 217, 226 and 228 carry data for a second mobile station $U_2$, 209, 210, 224 and 229 carry data for a third mobile station $U_3$ and 211, 213, 214, 216, 218, 219 and 222 carry data for a fourth mobile station $U_4$.

For the 3rd Generation CDMA mobile communication systems, DCA on a packet basis has been introduced by HSDPA (High Speed Downlink Packet Access) for the 3GPP (UMTS) standard (3GPP, Technical Specification 25.308; High Speed Downlink Packet Access (HSDPA); Overall description; Stage 2, v. 5.3.0, December 2002), and by HDR (High Data Rate) for the 3GPP2 CDMA 2000 standard (QUALCOMM, "1xEV: 1x Evolution IS-856 TIA/EIA Standard—Airlink Overview," available at http://www.qualcomm.com).

Link Adaptation (LA) Techniques

In order to utilize the benefits from DCA, it is usually combined with Link Adaptation (LA) techniques such as Adaptive Modulation and Coding (AMC) and Hybrid Automatic Repeat reQuest (HARQ).

Adaptive Modulation and Coding (AMC)

Employing Adaptive Modulation and Coding (AMC), the data rate within a PHY Frame for a scheduled user will be adapted dynamically to the instantaneous channel quality of the respective link by changing the Modulation and Coding Scheme (MCS). Naturally, this requires a channel quality estimate at the transmitter for the link to the respective receiver. For details of AMC, refer to H. Rohling and R. Grunheid, cited above, 3GPP TS25.308 cited above, A. Burr, Modulation and Coding for Wireless Communications, Pearson Education, Prentice Hall, ISBN 0 201 39857 5, 2001, pp. 255-267, and C. Y. Wong, R. S. Cheng, K. B. Letaief, and R. D. Murch "Multiuser OFDM with Adaptive Subcarrier, Bit, and Power Allocation," IEEE J. Select. Areas Commun., vol. 17, no. 10, October 1999.

Hybrid Automatic Repeat reQuest (HARQ)

To cope with the PHY Frame error rates caused by the selection of the MCS level (e.g. by incorrect channel quality estimation or inherent to the selected MCS level for a given channel quality), Hybrid Automatic Repeat reQuest (HARQ) schemes are used to control the data/packet loss rate (residual PHY Frame error rate after retransmissions) delivered to the next layer (or to the service/application). See H. Rohling and R. Grunheid, cited above, S. Kallel, "Analysis of a type II hybrid ARQ scheme with code combining," IEEE Transactions on Communications, Vol. 38, No. 8, August 1990, S. Lin, D. J. Costello Jr., "Error Control Coding: Fundamentals and Applications", Prentice-Hall, 1983, pp. 458-497, and S. Lin, D. J. Costello, M. J. Miller, "Automatic repeat request error control schemes," IEEE Commun. Mag., vol. 22, no. 12, pp. 5-17, December 1984.

Scheduler

In a system making use of DCA and LA (AMC and/or HARQ), a MAC/PHY Scheduler entity decides which recourses are assigned to which mobile station. A commonly used approach is to use centralized scheduling, where the scheduler is located in the transmitter (base station in the downlink case).

Common objectives of the scheduler are to achieve fairness between users, maximize system throughput and/or fulfill Quality of Service (QoS) requirements (e.g. delay, data rate, loss rate, jitter) for the applications/flows served to the scheduled mobile stations.

Proportional Fair (PF) Scheduler

The Proportional Fair scheduler (see e.g. J. M. Holzman, "Asymptotic analysis of proportional fair algorithm," Proc. IEEE PIMRC 2001, San Diego, Calif., pp. F 33-F 37, October 2001) maintains an average data rate transmitted to each user within a defined time window and examines the ratio of the instantaneous to the average channel conditions (or ratio of the instantaneous possible data rate to the average data rate) experienced by different users and chooses the user with the maximum ratio. This scheduler increases the system throughput with respect to Round Robin scheduling, while maintaining long-term fairness with respect to the allocated resources. The conventional Proportional Fair (PF) scheduler implementation works as follows:

For a given Shared Physical Channel at each scheduling time $t_n$ (e.g. PHY Frame according to FIG. 1), the priority function $P_m(t_n)$ is computed for each mobile station m:

$$P_m(t_n) = \frac{DRC_m(t_n)}{R_m(t_n)}, \quad (1)$$

where $t_n$ denotes the time index (n-th PHY Frame/time slot), $DRC_m(t_n)$ denotes the data rate potentially achievable for mobile station m at time $t_n$ according to the AMC (generally computed using either the SIR feedback from the MS or the known/estimated SIR value for the link at the BS) and $R_m(t_n)$ denotes the average rate served to this mobile station up to time $t_n$ (usually time windowed).

The mobile station m* with the highest priority $P_m(t_n)$ is scheduled at the current frame:

$$m^* = \arg\max_m \{P_m(t_n)\} \quad (2)$$
$$= \arg\max_m \left\{ \frac{DRC_m(t_n)}{R_m(t_n)} \right\}.$$

The PF scheduler is also called riding-on-peak scheduler, since a MS is preferably scheduled if its instantaneous channel condition has a peak. A general assumption is that all MS within a system have similar channel statistics. The PF scheduler maintains fairness on long-term basis; however, on a short-term basis it may be unfair.

The PF scheduler can be generalized by introducing coefficients α and β. This way the trade-off between fairness and system throughput performance can be tweaked. Hence, the selection of a mobile station m* to be scheduled works as follows:

$$m^* = \arg\max_m \left\{ \frac{[DRC_m(t_n)]^\alpha}{[R_m(t_n)]^\beta} \right\}, \quad (3)$$

where α and β are typically non-negative.

The following combinations of α and β denote special cases:

α=1 ∧β=1: Conventional PF scheduler (see equations (1) and (2)).

α=1 ∧β=0: Max Rate (MR) scheduler: the mobile station, which can achieve the highest rate is scheduled.

α=0 ∧β=1: Fair Scheduler with respect to data rate delivered to the mobile stations (not fair with respect to air-interface resources).

The (generalized) PF scheduler does not consider QoS requirements.

In the next section a scheduling approach is described which considers PHY channel states as well as QoS issues.

M-LWDF and "Exponential Rule" Scheduler

The M-LWDF (Modified-Largest Weighted Delay First) (see M. Andrews, et al., "Providing quality of service over a shared wireless link," IEEE Commun. Mag., pp. 150-154, February 2001) and "Exponential Rule" (see Sanjay Shakkottai, Alexander L. Stolyar, "Scheduling Algorithms for a Mixture of Real-Time and Non-Real Time Data in HDR," Technical Report, University of Illinois at Urbana-Champaign, Bell Laboratories, Lucent Technologies) are scheduling approaches for efficient QoS support and at the same time efficient air interface utilization for HDR, where it is assumed that only a single user receives data at a time, i.e. a single Shared Physical Channel 102 is assumed.

A block diagram of the M-LWDF and "Exponential Rule" scheduler is shown in FIG. 3. Unit 301 in physical layer/medium access control (MAC) layer scheduler 300 selects packets of queues 302 . . . 304, corresponding to users m=1 . . . M, for transmission over shared physical channel 102 employing adaptive modulation and coding in AMC unit 305. Unit 306 calculates a term $W_m(t_n)$ or an exponential rule term depending on $W_m(t_n)$. These terms reflect the state of the queues. Unit 307 calculates a potential data rate $DRC_m(t_n)$ and an average data rate $R_m(t_n)$ for user m. These values reflect the actual channel states $SIR_m(t_n)$ for the M users. Unit 301 calculates a priority function for each user m and each frame $t_n$, based on both $W_m(t_n)$ or the exponential rule term and $R_m(t_n)$, and schedules the HOL packet (Head-Of-Line; next packet in queue, which generally is the packet with the largest delay) of the queue with the highest priority function value as next packet to be transmitted.

For M users (mobile stations) in systems employing M-LWDF, at each scheduling instant $t_n$ the user m* is selected for transmission for whom the following priority function is maximal:

$$P_m(t_n) = \gamma_m(t_n) W_m(t_n) DRC_m(t_n) \quad (4)$$

$$m^* = \arg\max_m \{P_m(t_n)\}, \quad (5)$$

where $DRC_m(t_n)$ denotes the available data rate for user m at time $t_n$ (same as in equations (1) to (3) for the PF scheduler) and $W_m(t_n)$ denotes the delay of the HOL packet of the flow serving user m. For some flows, the HOL packet delay $W_m(t_n)$ may be replaced by a parameter $Q_m(t_n)$ which stands for the packet queue length in the transmit buffer (see M. Andrews, et al., cited above).

As can be seen from equation (4) the priority function depends on the current channel state of the user (reflected by the potential data rate $DRC_m(t_n)$), on the current delay/buffer status of the packet queue and on value $\gamma_m$. This way the M-LWDF scheduler considers PHY issues as well as QoS requirements.

According to M. Andrews, et al., cited above, a preferred implementation solution for the M-LWDF yields $\gamma_m = a_m/R_m(t_n)$ and $a_m = -\log(\delta_m)/T_m$ with $R_m(t_n)$ being the average data rate for user m. $T_m$ and $\delta_m$ represent the delay threshold and the maximum probability of exceeding it for user m (static QoS requirements), i.e. they denote the QoS requirement $\Pr\{W_m > T_m\} \leq \delta_m$, where $W_m$ denotes the packet delay. Equation (4) then yields:

$$P_m(t_n) = \underbrace{\frac{-\log(\delta_m)}{T_m} W_m(t_n)}_{\text{QoS related term}} \underbrace{\frac{DRC_m(t_n)}{R_m(t_n)}}_{\substack{\text{PHY related term} \\ \text{(PF scheduler)}}}, \quad (6)$$

More details on the M-LWDF scheduler such as e.g. a possible combination with a Token Bucket algorithm are given in M. Andrews, et al., cited above. The M-LWDF scheduler is furthermore described in published European Patent Application no. EP1130872A1.

For the "Exponential Rule" scheduler simply equation (4) is modified such that the HOL packet delay $W_m(t_n)$ is replaced by an exponential term (see Shakkottai and Stolyar, cited above). The priority function then yields $$P_m(t_n) = \gamma_m \exp\left(\frac{p_m W_m(t_n) - \overline{pW_{tot}}}{1 + \sqrt{\overline{pW_{tot}}}}\right) DRC_m(t_n) \quad (7)$$

with $$\overline{pW_{tot}} = \frac{1}{M} \sum_m p_m W_m(t_n), \quad (8)$$

where $\gamma_m$ and $p_m$ are sets of positive constants.

A further modified version of the "Exponential Rule" scheduler is described in Kapseok Chang and Youngnam Han, "QoS-based adaptive scheduling for a mixed service in HDR system", PIMRC 2002, vol. 4, pp. 1914-1918, September 2002.

It should be noted, that in the aforementioned M-LWDF based schedulers, the PHY dependent terms ($DRC_m(t_n)$ and $R_m(t_n)$) and the QoS term ($W_m(t_n)$ in case of M-LWDF) do not depend on each other and can be calculated independently.

As traffic on communication systems is increasing and Quality of Service demands are rising, there is a strong need for an improved scheduling algorithm which provides enhanced air interface efficiency and meets QoS demands in a better way. Moreover there is a need for a scheduling algorithm which supports multiple Shared Channel configurations.

SUMMARY OF THE INVENTION

It is an object of the present invention to serve the needs described above. This object is achieved by a method according to claim 1, by a computer-readable storage medium according to claim 14, by a transmission apparatus according to claim 15, a base station according to claim 17, and a mobile station according to claim 18. Advantageous embodiments are subject-matter of the dependent claims.

The present invention defines a new priority function which is improved over the priority functions of the M-LWDF and "Exponential Rule" packet scheduler.

The disclosed priority function provides the following features:
  Channel dependent scheduling;
  Separate treatment of flows and users;
  Taking into account the delay of multiple pending packets (not only HOL packet as for M-LWDF and "Exponential Rule") to be transmitted per flow;
  Fairness, throughput, fulfillment of QoS requirements and flow priorities can be optimized; and
  Multiple flows may be served at a time simultaneously.

In one aspect, the present invention provides a method for scheduling a plurality of data flows to a plurality of shared channels in a wireless communication system transmitting data packets in time intervals of frames and applying adaptive modulation and coding. The method comprises the steps of determining virtual link adaptation parameters for at least a part of all combinations of data flow and shared channel, based on state information from the respective shared channel, and based on Quality of Service requirements for the respective data flow; calculating potential data rates for said combinations of data flow and shared channel, based on said virtual link adaptation parameters; calculating priority values for said combinations of data flow and shared channel, based on said potential data rates, using the formula $P_{s,k}(t_n) = D_k \cdot S_k(t_n) \cdot G_{s,k}(t_n) \cdot C_{s,k}(t_n)$, wherein s denotes a shared channel, k denotes a data flow and $t_n$ denotes a particular frame; $P_{s,k}(t_n)$ is the calculated priority value for data flow k on shared channel s in frame $t_n$; $D_k$ is a value depending on Quality of Service requirements of data flow k; $S_k(t_n)$ is a weight for flow k during frame $t_n$; $G_{s,k}(t_n)$ is a metric reflecting a current buffer status of data flow k; and $C_{s,k}(t_n)$ is a metric reflecting the current potential data rate of the data flow k on shared channel s. The method further comprises the step of selecting, based on said priority values, for at least a part of the shared channels, a data flow for which data is to be transmitted on each of the part of the shared channels during the time interval of one frame.

In another aspect of the present invention, a computer-readable storage medium has stored thereon instructions that, when executed in a processor of a base station of a wireless communication system, causes the processor to perform the aforesaid method.

A further aspect of the present invention provides a base station for a wireless communication system transmitting data packets in time intervals of frames and applying adaptive modulation and coding. The base station comprises virtual link adaptation means configured to determine virtual link adaptation parameters for at least a part of all combinations of data flow and shared channel, based on state information from the respective shared channel, and based on Quality of Service requirements for the respective data flow; means for calculating potential data rates for said combinations of data flow and shared channel, based on said virtual link adaptation parameters; and a scheduler, configured to calculate priority values for said combinations of data flow and shared channel, based on said potential data rates, using the formula $P_{s,k}(t_n) = D_k \cdot S_k(t_n) \cdot G_{s,k}(t_n) \cdot C_{s,k}(t_n)$, where s denotes a shared channel, k denotes a data flow and $t_n$ denotes a particular frame; $P_{s,k}(t_n)$ is the calculated priority value for data flow k on shared channel s in frame $t_n$; $D_k$ is a value depending on Quality of Service requirements of data flow k; $S_k(t_n)$ is a weight for flow k during frame $t_n$; $G_{s,k}(t_n)$ is a metric reflecting a current buffer status of data flow k; and $C_{s,k}(t_n)$ is a metric reflecting the current potential data rate of the data flow k on shared channel s; and the scheduler is further configured to select, based on said priority values, for at least a part of the shared channels, a data flow for which data is to be transmitted on said shared channel during the time interval of one frame.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings, wherein like elements and structures are indicated by like reference numbers.

Figure 1:
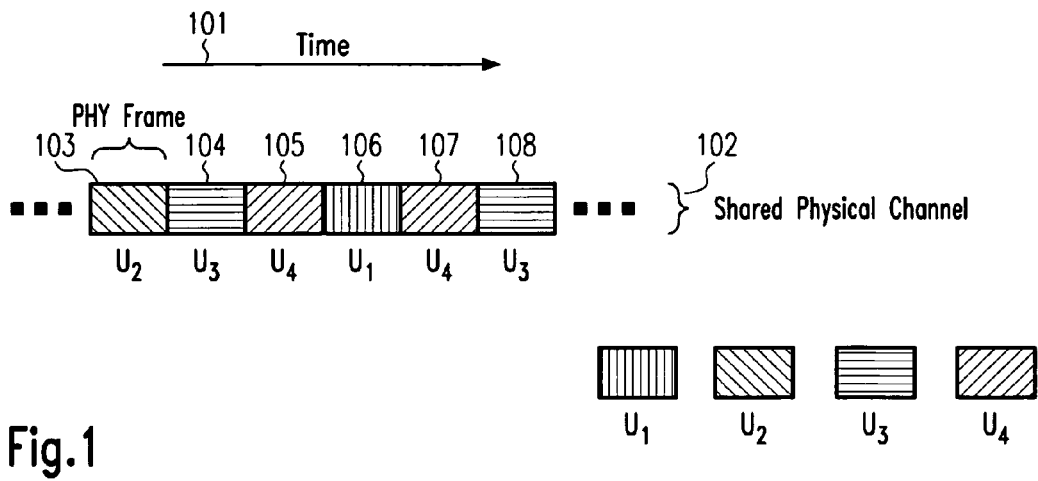
FIG. 1 shows an example for DCA with multiplexing four mobile stations (U1 to U4) on a single Shared Physical Channel.
Figure 2:
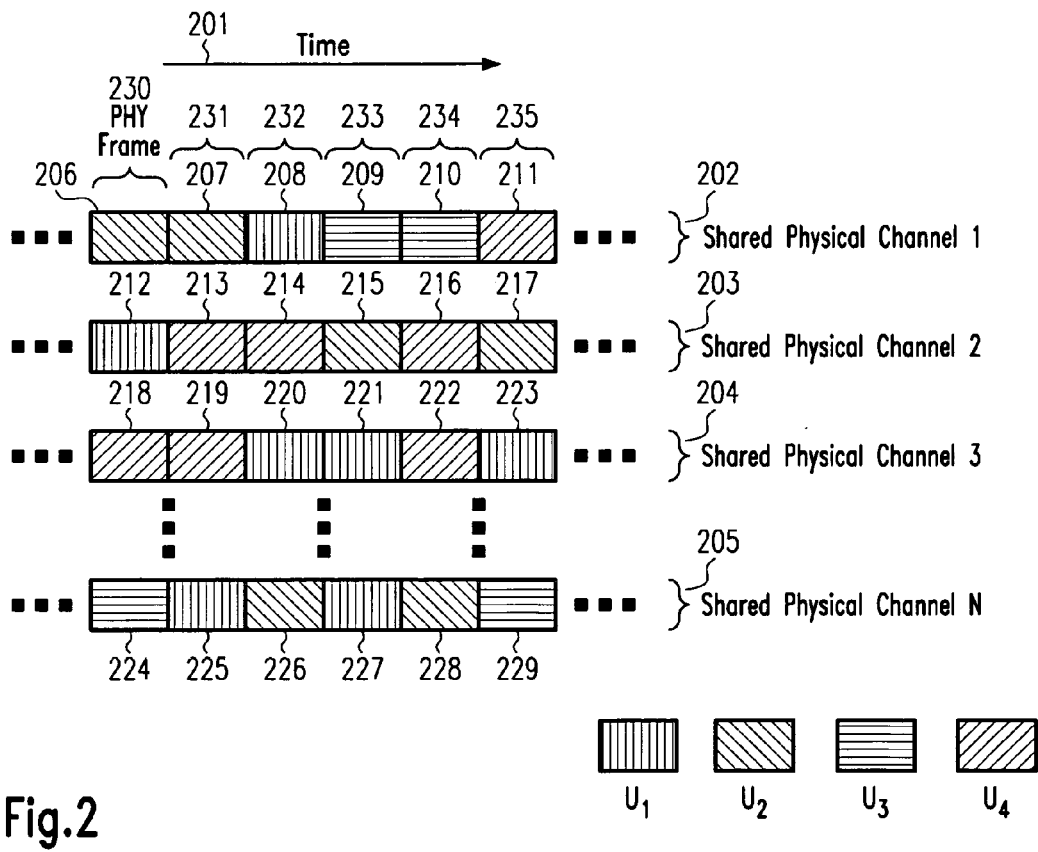
FIG. 2 illustrates an example for DCA with multiplexing four mobile stations (U1 to U4) on multiple (N) parallel Shared Physical Channels.
Figure 3:
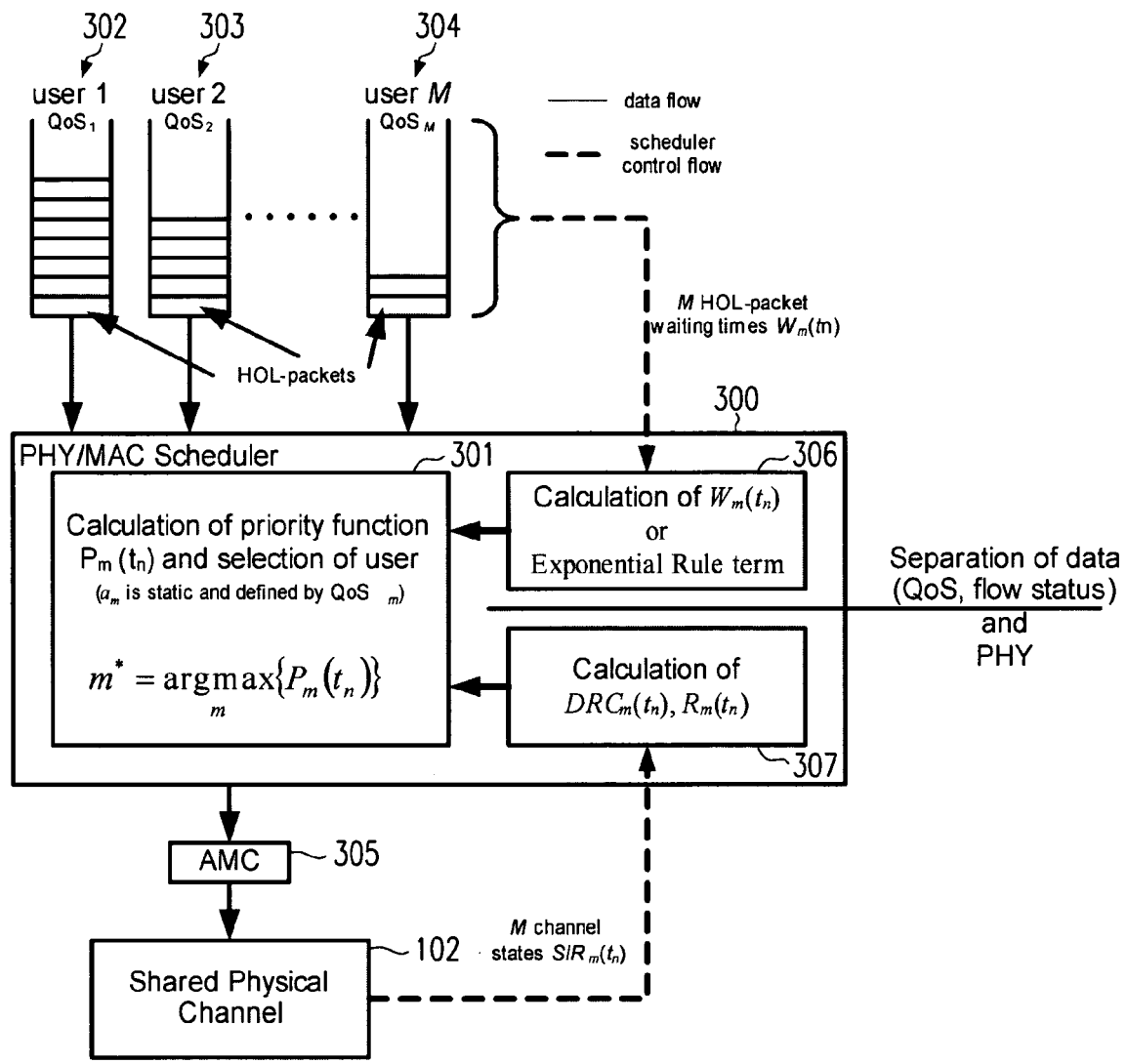
FIG. 3 depicts schematics of the M-LWDF and "Exponential Rule" schedulers.
Figure 4:
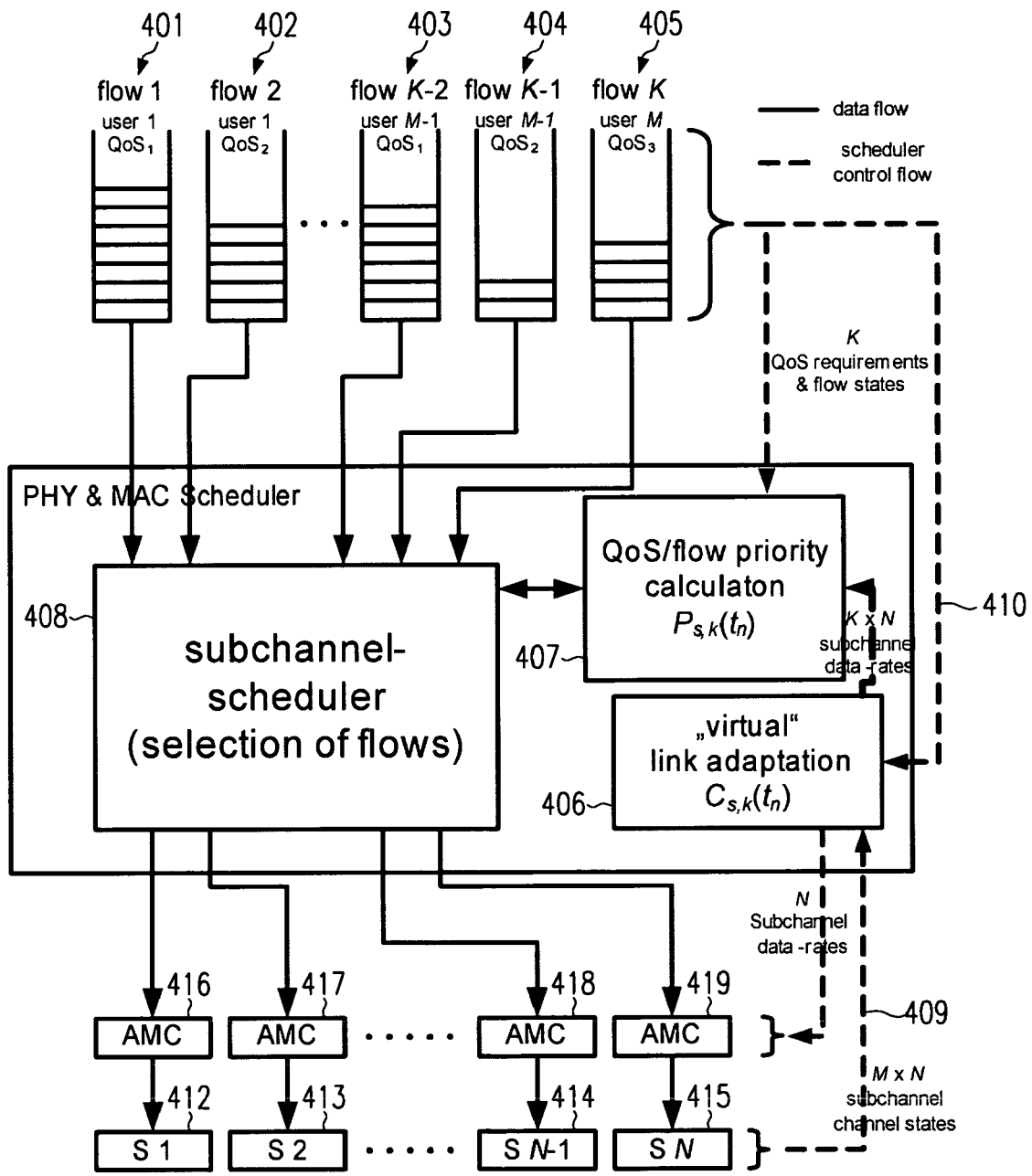
FIG. 4 shows schematics of a scheduler in which the described method can be implemented.

FIG. 4 shows the simplified scheduler architecture as defined in European Patent Application numbers 04013495.9 and 04013494.2 and in International Patent application numbers PCT/EP2004/013776 and PCT/EP2004/013777, which can be used for this invention.

In the example of FIG. 4, each of the flows (queues) 401 to 405 exclusively contains packets of one QoS class or service category only. This allows a simple access to the packet related information for the virtual link adaptation unit 406 and the priority calculation unit 407 and a simple FIFO ("first in first out") buffer functionality, as the subchannel (shared physical channel) scheduler 408 may always take the packet first, which has first entered the queue of the selected QoS class or service category (head of line, "HOL", packet).

As mentioned earlier, a system if this kind implements also an ARQ functionality. I.e. some of the packets may need to be retransmitted. Those packets may be handled separately from the disclosed concept or may simply be treated the same way as un-transmitted data. This also includes ARQ protocol effects, e.g. some packets in the transmit queue may not be available for scheduling at all times, since they are waiting for ARQ feedback. Since the ARQ is not an objective of the disclosed concept, the ARQ functionalities/effects are omitted in the following.

As a basis for scheduling metrics, virtual link adaptation unit 406 calculates information about potential data rates for at least some of the combinations of service category and physical channel. The calculation of these values is based on information about states of the subchannels (e.g. signal to noise ratio, transmission loss etc.) (arrow 409) and on the buffer status of the flows (arrow 410), where the buffer status may set an upper limit of the potential data rate which can be obtained from the subchannel, in the case that there is not enough data in a buffer to fill a complete frame at the given physical data rate. The state information or channel quality information about the subchannels may be received from the receivers of the data, that is the mobile stations of users 1 and 2, or may be measured by the transmitter by channel estimation. Advantageously, for each combination of subchannel and QoS class or service category an achievable data rate is calculated.

As the achievable data rate depends on the parameters of the transmission, like forward error correction coding rate and scheme, modulation scheme, power control, HARQ scheme, redundancy version selection etc, it is necessary to make assumptions on these values as an input for the calculation of the data rate. Therefore virtual link adaptation unit 406 also decides these assumptions, which is called herein "virtual link adaptation" due to its speculative nature. All related information may be handed to priority value calculation unit 407 (arrow 411).

As a basis for scheduling metrics, subchannel scheduler 408 receives priority information for each combination of subchannel 202-205 and QoS class or service category from priority calculation unit 407. Such a priority calculation may be based on the difference of a due time for delivery of the data within the buffer and belonging to the service category, minus the actual time ("time to live"). Alternatively it may be based on a ratio between desired transmission data rate and actual transmission rate in the recent past. In the case that the priority calculation is based on a property which may be different for different data packets within one QoS class or service category, the worst value of all buffered packets within a category may be determined and used for the calculation of the priority value.

The priority values may also depend on the input from the virtual link adaptation unit 406. They may be calculated using the same algorithm for all QoS classes or service categories. Alternatively they may be calculated using different algorithms for different QoS classes or service categories, depending on the parameters which are most critical for the respective QoS class or service category. Such parameters may comprise a required or actual data rate, a required or actual packet error rate, or a required or actual packet delay. As another alternative, a fixed value representing a fixed QoS class priority, a service category priority or a user dependent value might be used as priority value or as factor for the priority value calculation.

Based on the information input from priority calculation unit 407, the scheduler calculates scheduling metrics for each subchannel 412-415, preferably for each frame. Based on the scheduling metrics, it selects data flows to be served and maps data from the selected data flow (queue) onto a shared subchannel. Following the shared channel concept, data from any of the flows (queues 401-405 in FIG. 4) can be mapped onto any shared PHY channel 412-415. However, within one PHY frame it is preferred to map exclusively data from a single service category onto one subchannel. This allows link adaptation according to the QoS requirements in AMC units 416-419, which perform coding and modulation of the data blocks received from subchannel scheduler 408.

Based on the mapping decision, subchannel scheduler 408 collects packets to be combined into physical data blocks from the specified data flows and passes the scheduled data blocks to AMC units 416-419, respectively. AMC units 416-419 further receive transmission parameter information for appropriate processing. This may be achieved in different ways, yet leading to the same result that the real data rate of each shared physical channel matches the data rate calculated by the virtual link adaptation as a basis for the scheduling decision.

Figure 5:
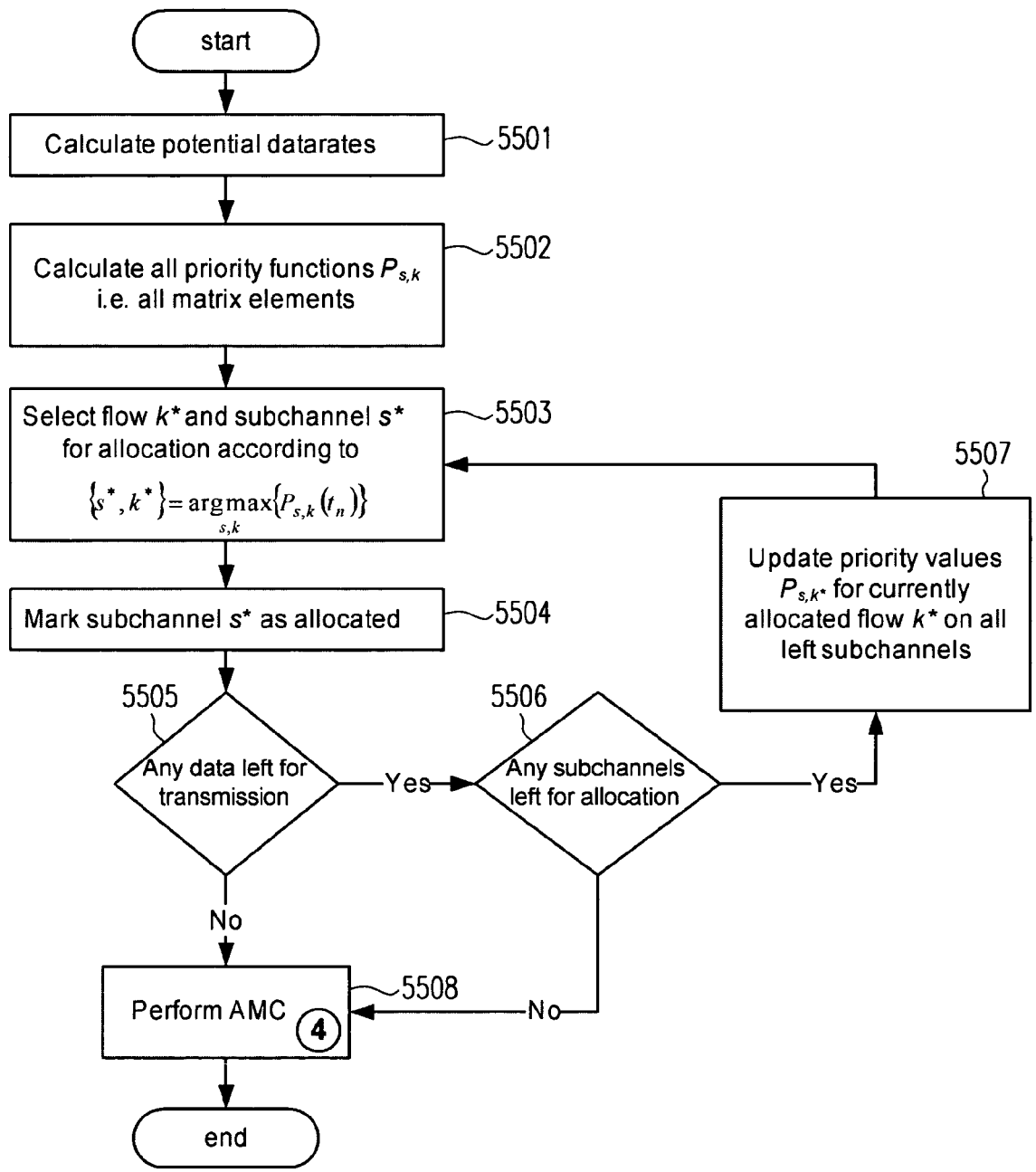
FIG. 5 depicts a flowchart of the described scheduling algorithm.

FIG. 5 shows the simplified flowchart of the scheduler algorithm, which is to be executed each scheduling instant.

First, the "virtual link adaptation" block calculates in S501 the potential data rates for each flow 401-405 on each subchannel 412-415 for the next radio frame to be scheduled. Note that the number of flows K may be different from the number of users M, since a user may have several flows at a time or may be inactive (no flow). Generally, the "virtual link adaptation" block 406 receives M×N channel states, if N shared channels (e.g. subchannels in OFDMA) are defined. Those M×N channel states are mapped onto K×N potential data rates, where the mapping function of the user dependent channel state to the flow dependent data rate may depend on the QoS requirements of the respective flow.

Next, K×N priority values are calculated in S502 (using the priority function) based on the input from the "virtual link adaptation" block and based on the QoS requirements of the flows.

In S503, the Shared Channel (subchannel) scheduler selects the combination of a flow and a subchannel with the currently highest value of the priority function, to be scheduled. The selected subchannel s* is marked in S504 as "reserved" and is not available for further allocation. Moreover, the scheduled packets of the allocated flow are removed from the flow buffer (alternatively they may be marked as scheduled).

If there is data for transmission (S505) and subchannels for allocation (S506) left, the priority values for the remaining (or all) subchannels of the just allocated flow are updated in S507, since due to the removal of the scheduled packets, the potential data rates and/or the priority value may change.

The allocation continues with the selection of the next flow-subchannel combination which now has the highest value of the priority function in a new instance of S503, and so on.

When all subchannels are allocated or there is no data left for transmission, the AMC unit performs the modulation and coding of the data of the respective flows for the allocated subchannels in S508. Note that this step may also be preformed after individual allocation of the flow-subchannel combination.

The calculation of the priority function which is essential for a good performance of the scheduling method, will be explained in detail in the following subsections.

Definition of the Priority Function

Assuming that a single user may be served by several flows with different QoS requirements at a time (a flow may contain data from different applications with similar/same QoS requirements), in the proposed scheduler a priority function $P_{s,k}(t_n)$ is used. $P_{s,k}(t_n)$ depends as well on the subchannel (Shared Channel) index s as on the flow index k and is defined as follows.

$$P_{s,k}(t_n) = D_k \cdot S_k(t_n) \cdot G_{s,k}(t_n) \cdot C_{s,k}(t_n), \quad (9)$$

with k denoting the k-th flow, which may belong to any user m, and with s denoting the subchannel (Shared Channel) index.

The formula further contains the following QoS, flow and traffic load related terms:

$D_k$ denotes a static metric reflecting the QoS requirements of flow k, $S_k(t_n)$ denotes a weight of flow k, $G_k(t_n)$ denotes a metric reflecting the current buffer status of flow k; and the channel state dependent term $C_{s,k}(t_n)$ denotes a metric reflecting the current potential ("virtual") data rate of flow k on subchannel s.

As shown in FIG. 4 and FIG. 5 and explained in following section, the calculation of $C_{s,k}(t_n)$ needs to be carried out before the calculation of $G_{s,k}(t_n)$.

In the following subsections the factors above are defined.

QoS Requirement Term $D_k$ $D_k$ may be defined according to the following rules:

$D_k = -\log(\epsilon_k)/(T_k)^\delta$ (see M-LWDF and "Exponential Rule" scheduler) with $T_k$ and $\epsilon_k$ denoting the delay threshold and the maximum probability of exceeding it for flow k respectively. $\delta$ may be any real number $\geq 0$.

$D_k = 1/(T_k)^\delta$ with $T_k$ denoting the delay threshold for flow k. $\delta$ may be any real number $\geq 0$.

$D_k$ may be ignored, i.e. $D_k$=const for all k

Flow Weight Term $S_k(t_n)$ $S_k(t_n)$ may be defined according to the following rules:

Simplification to a time-independent value $S_k$, where then $S_k$ denotes a weight for a given flow.

$S_k(t_n)$ may be dependent on the traffic load, e.g. $S_k(t_n)$ may be increased with increasing traffic load for flows with restrictive QoS requirements and/or $S_k(t_n)$ may be decreased with increasing traffic load for flows with non-restrictive QoS requirements.

$S_k(t_n)$ may be dependent on the type of subscription of the user served by the flow. E.g. some flows/users may be preferred based on the payment of a higher service fee.

$S_k(t_n)$ may be used to differentiate data from signaling information, i.e. if signaling information is sent over the Shared Physical Channel, $S_k(t_n)$ may be used to control the weight of the signaling vs. data.

$S_k(t_n)$ may be used to reflect a metric proportional to the mean data rate required by a flow.

$S_k(t_n)$ may be ignored, i.e. $S_k(t_n)$=const for all $t_n$, k.

Channel Term $C_{s,k}(t_n)$ $C_{s,k}(t_n)$ is defined according to the following equation:

$$C_{s,k}(t_n) = \frac{[DRC_{s,k}(t_n)]^\alpha}{[R_k(t_n)]^\beta}, \quad (10)$$

where $DRC_{s,k}(t_n)$ denotes the instantaneous data rate potentially achievable on subchannel s for flow k at time $t_n$ according to the AMC (from which the number of bits or packets to be mapped onto a subchannel can be easily calculated). $R_k(t_n)$ denotes the potential ("virtual") average data rate for flow k (usually time windowed over some frames, e.g. moving average or weighted moving average of the instantaneous "virtual" data rates $DRC_{s,k}(t_n)$), which is in contrast to the definition with the Proportional Fair Scheduler, where $R_m(t_n)$ denotes the actual served data rate.

$R_k(t_n)$ may denote the potential ("virtual") average data rate for subchannel s or may denote the potential ("virtual") average data rate averaged over multiple/all subchannels.

$DRC_{s,k}(t_n)$ is usually determined from the known, estimated or signaled user channel state using a look-up table and considering the amount of data available for transmission (transmit buffer status). Note that $DRC_{s,k}(t_n)$ may be different for flows belonging to the same user, since e.g. the achievable data rate is defined for a given error rate, which may be set differently depending on the QoS requirements of a flow or the $DRC_{s,k}(t_n)$ may be limited by the data available in the transmit buffer.

Alternatively, $C_{s,k}(t_n)$ may be directly defined by the channel state (e.g. Signal-to-Interference/Noise Ratio (SIR)):

$$C_{s,k}(t_n) = \frac{[SIR_{s,k}(t_n)]^\alpha}{[avrgSIR_k(t_n)]^\beta}, \quad (11)$$

where the averaging function of $avrgSIR_k(t_n)$ is defined analogous to $R_k(t_n)$ in equation (10), i.e. $avrgSIR_k(t_n)$ may denote the average SIR for subchannel s or may denote the average data rate SIR over all subchannels.

In case the $SIR_{s,k}(t_n)$ allows a transmission of more packets (larger data rate) than available in the transmit buffer for flow k, the actual $SIR_{s,k}(t_n)$ value may be reduced in order to reflect a SIR which is representative for the data rate which can actually be achieved according to the packet queue size in the transmit buffer.

Note that in case $C_{s,k}(t_n)$ is defined according to equation (11), the number of bits or packets to be mapped onto a subchannel needs also to be calculated (see next section).

Flow Buffer Status Term $G_{s,k}(t_n)$ $G_{s,k}(t_n)$ is defined according to the following equation:

$$G_{s,k}(t_n) = \frac{1}{B_k \cdot (J_{s,k})^\gamma} \left[ \sum_{j=1}^{J_{s,k}} f_{j,k} \cdot b_{j,k} \cdot g_{j,k}(t_n) \right]^\gamma, \quad (12)$$

with j=1 indicating the Head of Line (HOL) packet, $g_{j,k}(t_n)$ reflecting the delay/buffer status of a pending packet j of flow k and $f_{j,k}$, $b_{j,k}$ reflecting weights of packets j. $B_k$ denotes a metric reflecting the total data size (e.g. in bits) of the $J_{s,k}$ packets.

$f_{j,k}$ is a monotonic decreasing function ($f_{j,k} \geq f_{j+1,k}$) in j in order to increase the weights of packets close to the HOL position. For simplification reasons $f_{j,k}$ may be ignored, i.e. $f_{j,k}$=const.).

$b_{j,k}$ reflects the size of packet j (e.g. in bits). For simplification or for equal packet sizes $b_{j,k}$ may be constant.

$B_k$ reflects to total size of the $J_{s,k}$ packets, i.e.

$$B_k = \sum_{j=1}^{J_{s,k}} b_{j,k}.$$

$g_{j,k}(t_n)$ may be defined as follows:

$g_{j,k}(t_n) = W_{j,k}(t_n)$, with $W_{j,k}(t_n)$ denoting the waiting time of packet j of flow k (see M-LWDF scheduler), or $$g_{j,k}(t_n) = \exp\left( \frac{p_k W_{j,k}(t_n) - \overline{pW_{tot}}}{1 + \sqrt{\overline{pW_{tot}}}} \right)$$

(see "Exponential Rule" scheduler). with $$\overline{pW_{tot}} = \frac{1}{K} \sum_k \frac{1}{J_{s,k}} \sum_j^{J_{s,k}} p_k W_{j,k}(t_n)$$

$J_{s,k}$ may be defined as follows:

$J_{s,k} = N_{s,k}$ with $N_{s,k}$ denoting the number of packets of flow k which may be transmitted at time $t_n$ on subchannel s according to the instantaneous "virtual" data rate $DRC_{s,k}(t_n)$ given for $C_{s,k}(t_n)$ in equation (10).

$J_{s,k} < N_{s,k}$ e.g. for complexity reasons.

$J_{s,k}$=number of total packets in the buffer of flow k.

Note, that in a special case a packet may consist of a single bit only.

Scheduler Selection Procedure

Compared to prior art, the disclosed scheduler does not select user *m, but allocates the flow k* on the subchannel s* according to the following rule (see also FIG. 5)

$$\{s^*, k^*\} = \arg\max_{s,k} \{P_{s,k}(t_n)\} \quad (13)$$

Note, that according to the flowchart in FIG. 5 for the multiple Shared Channel case (multiple subchannels), several flow-subchannel combinations are selected. The priority functions $P_{s,k}(t_n)$ of the flow allocated last, need to be updated for the next selection.

In case of a single Shared Channel, the selection is just performed once.

As shown above, the priority function $P_{s,k}(t_n)$ is defined by the factors $D_k$, $S_k(t_n)$, $G_{s,k}(t_n)$ and $C_{s,k}(t_n)$. The following paragraphs show several preferred settings for these factors.

First Preferred Setting $$D_k = 1/(T_k)^\delta$$

$$S_k(t_n) = const$$

$$C_{s,k}(t_n) = \frac{[SIR_{s,k}(t_n)]^\alpha}{[avrgSIR_k(t_n)]^\beta} \text{ with } \alpha = \beta$$

$$G_{s,k}(t_n) = \frac{1}{B_k \cdot (J_{s,k})^\gamma} \left[ \sum_{j=1}^{J_{s,k}} b_{j,k} \cdot g_{j,k}(t_n) \right]^\gamma \text{ with } J_{s,k} = N_{s,k}$$

and $g_{j,k}(t_n) = W_{j,k}(t_n)$ with parameter settings:

$\delta = \gamma = 1 \ldots 6$ $\alpha = \beta = 1 \ldots 6$

Second Preferred Setting

In this setting the factors are defined as in the first preferred setting, but the SIR reduction functionality is used for the Channel Term $C_{s,k}(t_n)$ as defined in equation (11).

Third Preferred Setting

In this setting the factors are defined as in the first preferred setting, but defining the Channel Term $C_k(t_n)$ is defined based on the data rate:

$$C_{s,k}(t_n) = \frac{[DRC_{s,k}(t_n)]^\alpha}{[R_k(t_n)]^\beta}$$

Fourth to Seventh Preferred Settings

In these settings, the factors have the same definitions as in the first to third preferred setting, except for $$g_{j,k}(t_n) = \exp\left(\frac{p_k W_{j,k}(t_n) - \overline{pW_{tot}}}{1 + \sqrt{\overline{pW_{tot}}}}\right).$$

The disclosed scheduler algorithm may be combined with rate control schemes (e.g. leaky/token bucket) in order to control queue sizes, i.e. stabilizing queue sizes.

Furthermore, data flow packets may be segmented in order to avoid padding on the Shared Physical Channels.

Figure 6:
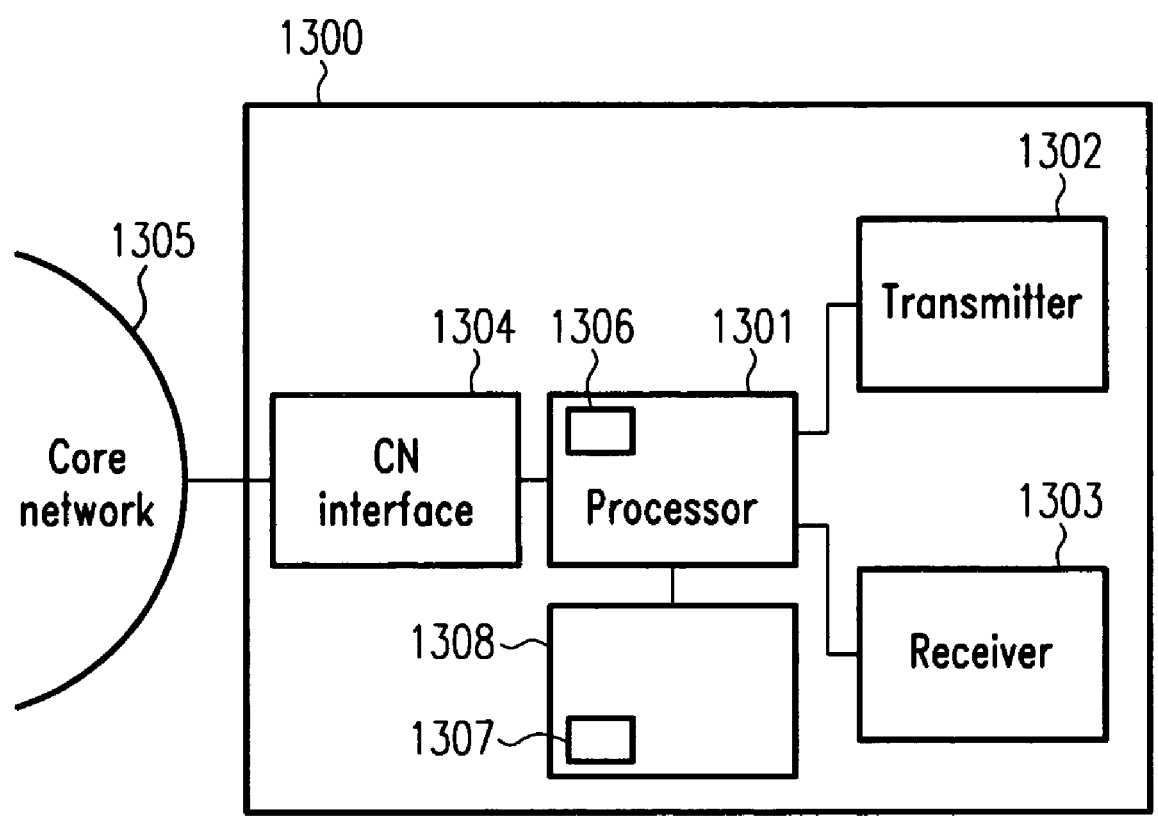
FIG. 6 illustrates an exemplary structure of a base station in which the present invention can be applied.

FIG. 6 illustrates the structure of a base station 600 in which the method described above can be utilized. It comprises a processor 601 which is configured for handling data, carrying out protocol functions and controlling the components of the base station. It may comprise one or more programmable microprocessors or microcontrollers together with memory for storing data and instructions. Instructions which cause the processor to carry out the methods according to the present invention may be stored in non-volatile semiconductor memory 606 like read-only memory, programmable read only memory, flash memory and so on. Additionally it may be stored onto other computer-readable media 607 such as magnetic disk, magnetic tape and optical disk, for download into the non-volatile memory 606 of processor 601, using an appropriate reader 608. Processor 601 may also comprise hardware logic, which may be fixed or field programmable. The described methods or parts thereof may also be executed in such hardware logic. Furthermore mixed hardware and software implementations are possible.

Base station 600 also comprises a transmitter 602 and a receiver 603 for establishing a wireless connection to a mobile station, and a network interface 604 for connecting it, directly or via other devices (not shown), with the core network 605 of the wireless network.

The invention claimed is:

1. A method for scheduling a plurality of data flows to a plurality of shared channels in a wireless communication system transmitting data packets in time intervals of frames and applying adaptive modulation and coding, the method comprising the steps of:
   a) determining virtual link adaptation parameters for at least a part of all combinations of data flow and shared channel, based on state information from the respective shared channel, and based on Quality of Service requirements for the respective data flow;
   b) calculating potential data rates for said combinations of data flow and shared channel, based on said virtual link adaptation parameters;
   c) calculating priority values for said combinations of data flow and shared channel, based on said potential data rates, using a formula $$P_{s,k}(t_n) = D_k \cdot S_k(t_n) \cdot G_{s,k}(t_n) \cdot C_{s,k}(t_n),$$

wherein
   s denotes a shared channel, k denotes a data flow and $t_n$ denotes a particular frame;
   $P_{s,k}(t_n)$ is the calculated priority value for data flow k on shared channel s in frame $t_n$;
   $D_k$ is a value depending on Quality of Service requirements of data flow k;
   $S_k(t_n)$ is a weight for flow k during frame $t_n$;
   $G_{s,k}(t_n)$ is a metric reflecting a current buffer status of data flow k, and
   $C_{s,k}(t_n)$ is a metric reflecting the current potential data rate calculated in step b), of data flow k on shared channel s; and
   d) selecting, based on said priority values, for at least a part of the shared channels, a data flow for which data is to be transmitted on each of the part of the shared channels during the time interval of one frame.

2. The method of claim 1, wherein step d) selects a data flow having the highest priority value for data transmission on said shared channel during said time interval of one frame.

3. The method of claim 1, wherein said weight $S_k(t_n)$ is depending on at least one of
   i) a type of subscription of a user who is served by the respective data flow;
   ii) whether said data flow carries user data or signalling information;
   iii) a required average data rate associated with the respective data flow.

4. The method of claim 1, wherein said weight $S_k(t_n)$ is increased with increasing traffic load for flows with restrictive Quality of Service requirements and/or decreased with increasing traffic load for flows with non-restrictive Quality of Service requirements.

5. The method of claim 1, wherein said value depending on Quality of Service requirements of data flow k is calculated using the formula $$D_k = -\log(\epsilon_k)/(T_k)^\delta$$

wherein
$T_k$ and $\epsilon_k$ denote the delay threshold and the maximum probability of exceeding it for flow k respectively; and
$\delta$ is a real number greater than or equal to zero.

6. The method of claim 1, wherein said metric reflecting a current potential data rate of data flow k on shared channel s is calculated using the formula $$C_{s,k}(t_n) = \frac{[DRC_{s,k}(t_n)]^\alpha}{[R_k(t_n)]^\beta}$$

wherein
$DRC_{s,k}(t_n)$ denotes the instantaneous data-rate potentially achievable on shared channel s for flow k at time $t_n$ according to current settings of adaptive modulation and coding;
$R_k(t_n)$ denotes a potential average data rate for flow k; and
$\alpha$ and $\beta$ are real constants greater than zero.

7. The method of claim 1, wherein said metric reflecting a current potential data rate of data flow k on shared channel s is calculated using the formula $$C_{s,k}(t_n) = \frac{[SIR_{s,k}(t_n)]^\alpha}{[avrgSIR_k(t_n)]^\beta}$$

wherein
$SIR_{s,k}(t_n)$ is a Signal to Interference/Noise Ratio for data flow k on shared channel s;
$avrgSIR_k(t_n)$ is either an average Signal to Interference/Noise Ratio for shared channel s or an average Signal to Interference/Noise Ratio over multiple/all shared channels.

8. The method of claim 1, wherein said metric reflecting a current buffer status of data flow k is calculated using the formula $$G_{s,k}(t_n) = \frac{1}{B_k \cdot (J_{s,k})^\gamma} \left[ \sum_{j=1}^{J_{s,k}} f_{j,k} \cdot b_{j,k} \cdot g_{j,k}(t_n) \right]^\gamma$$

wherein
j is an index of a packet in a buffer of a data flow, with j=1 indicating a packet to be scheduled next;
$f_{j,k}$ is a monotonic decreasing function ($f_{j,k} \geq f_{j+1,k}$) in j;
$b_{j,k}$ is a size of packet j;
$J_{s,k}$ is either
  i) a value equal to or smaller than a number of packets of flow k which may be transmitted at time $t_n$ on shared channel s according to an instantaneous data rate potentially achievable on shared channel s for flow k at time $t_n$ according to current settings of adaptive modulation and coding; or
  ii) a number of total packets in a buffer of flow k;
$B_k$ is defined as $$B_k = \sum_{j=1}^{J_{s,k}} b_{j,k};$$

and
$g_{j,k}(t_n)$ is a waiting time of packet j in flow k.

9. The method of claim 1, wherein $$D_k = 1/(T_k)^\delta;$$
$$S_k(t_n) = const;$$
$$C_{s,k}(t_n) = \frac{[SIR_{s,k}(t_n)]^\alpha}{[avrgSIR_k(t_n)]^\beta} \text{ with } \alpha = \beta;$$
$$G_{s,k}(t_n) = \frac{1}{B_k \cdot (J_{s,k})^\gamma} \left[ \sum_{j=1}^{J_{s,k}} b_{j,k} \cdot g_{j,k}(t_n) \right]^\gamma \text{ with } J_{s,k} = N_{s,k};$$

with parameter settings:
$\delta=\gamma=1 \ldots 6$;
$\alpha=\beta=1 \ldots 6$.

10. The method of claim 1, wherein $$D_k = 1/(T_k)^\delta;$$
$$S_k(t_n) = const;$$
$$C_{s,k}(t_n) = \frac{[SIR_{s,k}(t_n)]^\alpha}{[avrgSIR_k(t_n)]^\beta};$$
$$G_{s,k}(t_n) = \frac{1}{B_k \cdot (J_{s,k})^\gamma} \left[ \sum_{j=1}^{J_{s,k}} b_{j,k} \cdot g_{j,k}(t_n) \right]^\gamma \text{ with } J_{s,k} = N_{s,k};$$

with parameter settings:
$\delta=\gamma=1 \ldots 6$;
$\alpha=1 \ldots 6$;
$\beta=1$.

11. The method of claim 1, wherein $$D_k = 1/(T_k)^\delta;$$
$$S_k(t_n) = const;$$
$$C_{s,k}(t_n) = \frac{[DRC_{s,k}(t_n)]^\alpha}{[R_k(t_n)]^\beta}$$
$$G_{s,k}(t_n) = \frac{1}{B_k \cdot (J_{s,k})^\gamma} \left[ \sum_{j=1}^{J_{s,k}} b_{j,k} \cdot g_{j,k}(t_n) \right]^\gamma \text{ with } J_{s,k} = N_{s,k};$$

with parameter settings:
$\delta=\gamma=1 \ldots 6$;
$\alpha=1 \ldots 6$;
$\beta=1$.

12. The method of claim 9, wherein $g_{j,k}(t_n)=W_{j,k}(t_n)$.

13. The method of claim 9, wherein $$g_{j,k}(t_n) = \exp\left( \frac{p_k W_{j,k}(t_n) - \overline{pW_{tot}}}{1 + \sqrt{\overline{pW_{tot}}}} \right).$$

14. A computer-readable storage medium having stored thereon instructions that, when executed in a processor of a base station or a mobile station of a wireless communication system, causes the processor to perform the method of claim 1.

15. A transmission apparatus for a wireless communication system transmitting data packets in time intervals of frames and applying adaptive modulation and coding, the transmission apparatus comprising:
  virtual link adaptation means configured to determine virtual link adaptation parameters for at least a part of all combinations of data flow and shared channel, based on state information from the respective shared channel, and based on Quality of Service requirements for the respective data flow;
  means for calculating potential data rates for said combinations of data flow and shared channel, based on said virtual link adaptation parameters; and
  a scheduler, configured i) to calculate priority values for said combinations of data flow and shared channel, based on said potential data rates, using a formula $$P_{s,k}(t_n)=D_k \cdot S_k(t_n) \cdot G_{s,k}(t_n) \cdot C_{s,k}(t_n),$$

where s denotes a shared channel, k denotes a data flow and $t_n$ denotes a particular frame;
  $P_{s,k}(t_n)$ is the calculated priority value for data flow k on shared channel s in frame $t_n$;
  $D_k$ is a value depending on Quality of Service requirements of data flow k;
  $S_k(t_n)$ is a weight for flow k during frame $t_n$;
  $G_{s,k}(t_n)$ is a metric reflecting a current buffer status of data flow k; and
  $C_{s,k}(t_n)$ is a metric reflecting the current potential data rate calculated in step b), of data flow k on shared channel s; and
  ii) to select, based on said priority values, for at least a part of the shared channels, a data flow for which data is to be transmitted on said shared channel during the time interval of one frame.

16. The transmission apparatus of claim 15, wherein the scheduler is further configured to select the data flow with the highest priority value for data transmission on said shared channel during said time interval of one frame.

17. A base station for a wireless communication system, the base station comprising the transmission apparatus according to claim 15.

18. A mobile station for a wireless communication system, the mobile station comprising the transmission apparatus according to claim 15.

* * * * *